Dec. 13, 1927.
J. D. SARTAKOFF
1,652,376
VARIABLE CONDENSER
Filed Sept. 29, 1925
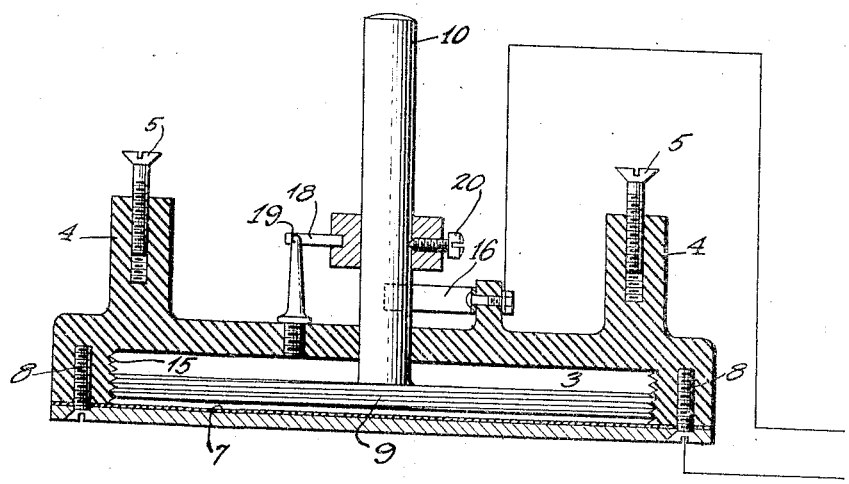
INVENTOR.
Jack D. Sartakoff
BY Jas H. Griffin
ATTORNEYS.

Patented Dec. 13, 1927.

1,652,376

UNITED STATES PATENT OFFICE.

JACK D. SARTAKOFF, OF NEW YORK, N. Y., ASSIGNOR OF ONE-HALF TO KHETAH CORPORATION, OF NEW YORK, N. Y., A CORPORATION OF NEW YORK.

VARIABLE CONDENSER.

Application filed September 29, 1925. Serial No. 59,364.

This invention is a variable condenser intended, more particularly, for use in radio receiving sets.

The object of the invention is to provide a condenser of extreme simplicity and compactness and one which will be sealed to exclude dust, moisture, etc., from contact with the plates.

The invention embodies numerous novel features of construction, e. g., this condenser embodies two plates adapted for relative rectangular movement in an axial direction to vary the capacity, and between these plates I employ both air and a solid substance as dielectrics. The solid substance positively precludes contact between the plates with consequent short circuiting of the condenser. Both the plates and the solid dielectric are provided with plane surfaces and the said dielectric is permanently secured to one of said plates to insure uniformity of operation of the structure.

In practically carrying out the invention, a threaded connection is provided between the plates so that when one is rotated, they are shifted toward or away from one another to effect the change in capacity. However, as the plates come into close proximity, the movable one engages the solid dielectric and further movement in this direction is arrested so that the plates cannot possibly contact with one another.

In its preferred, practical form, the condenser embodies a hollow insulating casing, one side of which is closed by a metal plate. This plate is permanently secured to the casing and over the inner surface of said plate is a sheet of solid dielectric substance which is adhesively secured to the plate throughout and is preferably clamped at its edges between the plate and casing. Positioned within the casing and coaxial with the fixed plate, a movable metal plate which has a stem or spindle projecting through the closed end of the casing is adapted to receive and carry a suitable dial. The movable plate has threaded connection with and this bushing is rigidly fixed to the casing so that rotation of the spindle will shift it longitudinally to vary the distance between the plates. A stop is provided on the spindle to coact with a stop on the casing to limit the rotation of the spindle to the desired range. With this arrangement, all the operating parts except the projecting portion of the spindle are housed within a dust and moisture proof casing and will be fully protected thereby.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

The drawing shows a section through the condenser embodying the present invention.

Referring to the drawings, 1 designates a casing of insulating material, such, for example, as bakelite, composition of hard rubber or the like. The casing is, in practice, preferably made circular in contour and is hollow as shown in the drawings. It is provided with a substantially closed side 2 forming within the casing a chamber 3.

Preferably molded integral with the casing are attaching posts 4, which are adapted to receive screws 5, whereby the device may be mounted on a panel of a receiving set. The open side of the casing is closed by a metal plate 6, the inner surface of which is covered by a sheet of solid dielectric 7. The sheet 7 may be any suitable di-electric, and this sheet is permanently secured to the plate 6 throughout its entire extent, so as to hold the sheet firmly to the plate throughout and preclude buckling or wrinkling of the sheet.

In practice, I preferably extend the sheet to the outer periphery of the casing and clamp the margin of such sheet tightly in position by means of the screws 8, which bind the plate 6 to the casing. 9 designates the movable plate of the condenser. It is of metal and is provided with a spindle 10, which extends through an opening in the closed end of the casing.

The outer periphery of the plate 6 is threaded and cooperates with threads 15 formed on the inner periphery of the casing.

In practice, a knob, dial, or other suitable operating member is secured to the spindle 10 and through rotation of such operating member, the spindle is turned for the purpose of shifting the movable plate axially on its threaded connection with the casing for the purpose of varying the distance between said movable plate and the fixed plate in order that the capacity of the condenser may be varied. The plates are included in circuit in any suitable manner as by a binding screw with a fixed plate and a brush or pigtail contact with the spindle of the movable plate.

I preferably associated with the spindle means for limiting its rotation within predetermined limits and a very convenient form of this means consists in a metal collar 17 carrying a radial finger 18 adapted to co-operate with a suitable fixed stop. A stop 19 is shown as a post mounted on the casing. The collar may be positioned to permit of the desired adjustment of the movable plate and a set screw 20 thereupon tightened to lock the collar against shifting so that thereafter the plate will move within fixed and predetermined limits.

The construction, which I have described, possesses marked advantages. For example, it will be apparent that a very fine adjustment of the distance between the plates can be obtained. Moreover, all of the operating parts except the projecting portion of the spindle are housed within the insulating casing which not only serves to support all of the parts, but also forms a dust proof and moisture proof housing.

The solid dielectric sheet 7 positively precludes engagement between the fixed and movable plates since after the plate 9 has been screwed down sufficiently to come in contact with the dielectric sheet, a further movement of this plate in the direction of the fixed plate is precluded. It will be apparent, however, that, under ordinary conditions, of operation covering the wave length band of broadcasting, the movable plate will generally be free from engagement with the sheet 7, so that the condenser will function as a combined air condenser and solid dielectric.

Careful experimentation and tests have shown that a great range of capacities and frequencies can be covered by this condenser and that the frequency has unusually straight line characteristics.

The accompanying drawings show the invention in its preferred practical form, but the invention is to be understood as fully commensurate with the appended claims.

Having thus fully described the invention, what I claim as new and desire to secure by Letters Patent is:

1. A variable condenser embodying a hollow casing of insulating material having a threaded circular interior, open at one side and provided at its opposite side with an axial opening, a metal plate fixed to the open side of the casing and rigid therewith, a solid dielectric overlying the inner face of said plate and rigidly secured thereto throughout its extent and clamped at its margins between the plate and casing, and a movable plate positioned within the casing and having a spindle extending through the opening of the casing, and said movable plate having a threaded periphery engaging with the threads of the interior of the casing, whereby rotation of the spindle results in the shifting of the movable plate toward or away from the fixed plate to vary the capacity.

2. A variable condenser embodying a hollow casing of insulating material having a threaded circular interior, open at one side and provided at its opposite side with an axial opening, a metal plate fixed to the open side of the casing and rigid therewith, and a movable plate positioned within the casing and having a spindle extending through the opening of the casing, and said movable plate having a threaded periphery engaging with the threads of the interior of the casing, whereby rotation of the spindle results in the shifting of the movable plate toward or away from the fixed plate to vary the capacity.

In testimony whereof I have signed the foregoing specification.

JACK D. SARTAKOFF.